United States Patent [19]

Brown

[11] 4,185,375

[45] Jan. 29, 1980

[54] METHOD OF APPLYING HANDLE COVERINGS

[76] Inventor: Horace R. Brown, 12 Frandon Dr., Danbury, Conn. 06810

[21] Appl. No.: 827,225

[22] Filed: Aug. 24, 1977

Related U.S. Application Data

[63] Continuation-in-part of Ser. No. 675,488, Apr. 9, 1976, abandoned.

[51] Int. Cl.² .............................................. B23P 11/02
[52] U.S. Cl. ........................................ 29/450; 29/234; 29/235; 206/303; 206/446
[58] Field of Search ........................ 29/235, 450, 234; 206/303, 493, 446

[56] References Cited

U.S. PATENT DOCUMENTS

| | | | |
|---|---|---|---|
| 636,919 | 11/1899 | Miller | 29/235 UX |
| 894,221 | 7/1908 | Merritt | 29/234 |
| 931,454 | 8/1909 | Miller | 29/235 UX |
| 2,038,840 | 4/1936 | Hall | 29/235 |
| 2,840,896 | 7/1958 | Edwards | 29/450 |
| 3,824,331 | 7/1974 | Mixon, Jr. et al. | 29/450 X |

FOREIGN PATENT DOCUMENTS 1206654 9/1970 United Kingdom ...................... 29/235

Primary Examiner—Charlie T. Moon
Attorney, Agent, or Firm—William G. Rhines

[57] ABSTRACT

This invention relates to grasping surfaces for the handles of implements, such as sporting equipment, and to methods of packaging and preparing same for application, and to methods for applying same to such equipment, and in one embodiment comprises at least one tube of elastomeric material which has been rolled back on itself to form a ring-like or grommet-like structure which is spiral in cross-section and has been positioned on a support core from which it may be rolled onto the handle portion of the implement which it is to cover and then unrolled to form a continuous covering for grasping purposes.

1 Claim, 7 Drawing Figures

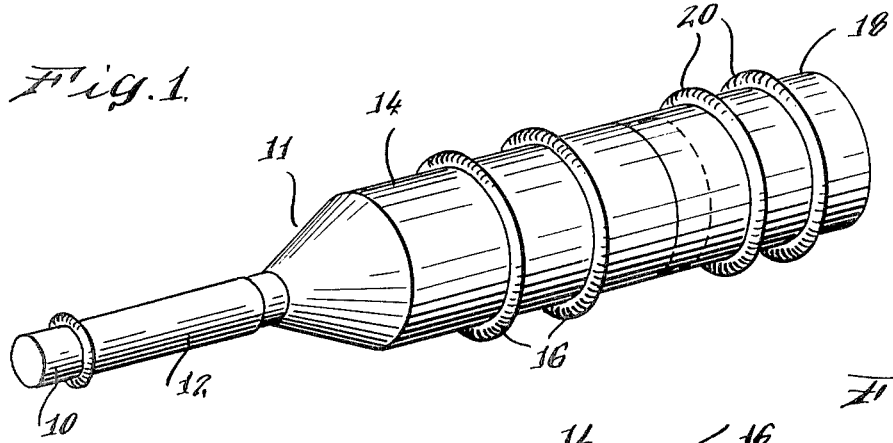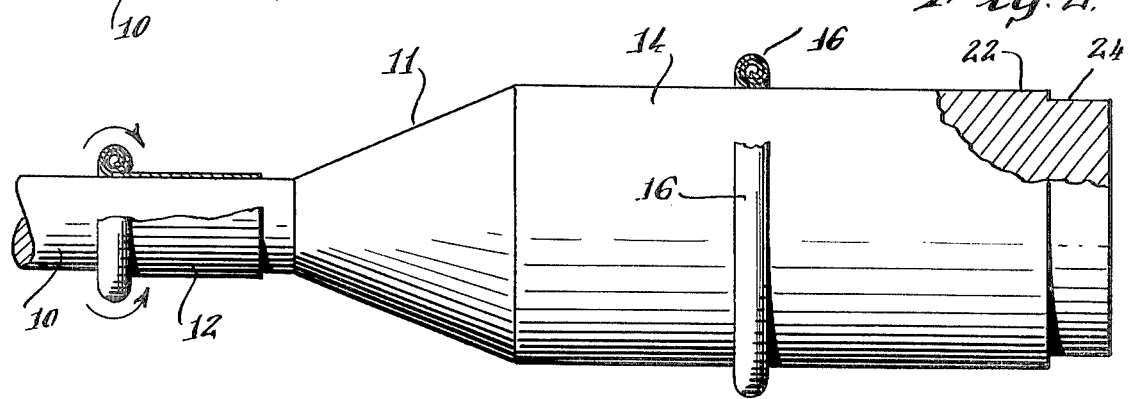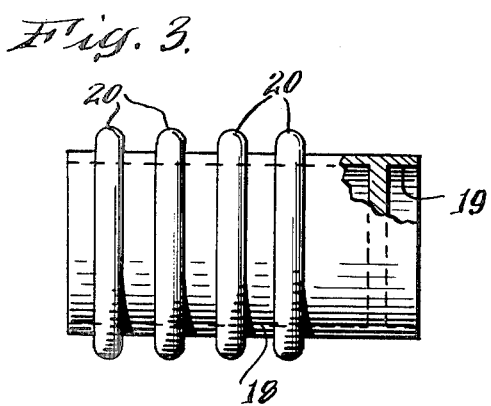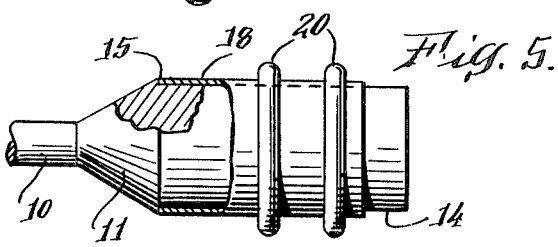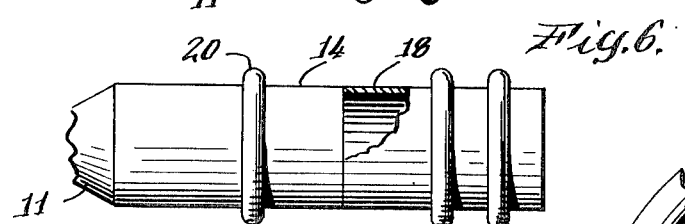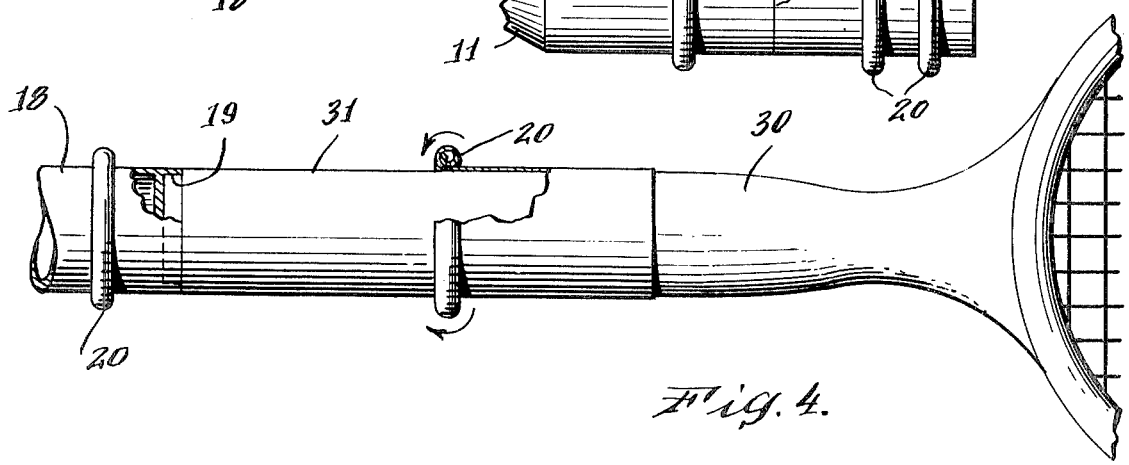

OUTER PROTECTIVE TUBE

METHOD OF APPLYING HANDLE COVERINGS

RELATED APPLICATION

This is a continuation-in-part of application Ser. No. 675,488, filed Apr. 9, 1976 now abandoned.

BACKGROUND OF THE INVENTION

In the field of hand-held implements, and particularly of sporting implements such as tennis rackets or golf clubs, frequently it is desired to position a friction surface on the handle portion to facilitate retention of the implement upon grasping it with the hand. Thus, for example, in addition to those instances where it is desired to apply a new surface to a handle, when the surface covering on the handle of a tennis racquet or a golf club handle wears out, or becomes hardened with use or through exposure to the elements and/or the perspiring hand of a user, it may be desired to install a new covering which is relatively resilient and has acceptable friction properties, so that the racquet will not fly out of the user's hand as it is swung.

Heretofore, there has been no truly satisfactory, inexpensive and simple means available for achieving such re-surfacing of such handles. For example, relatively complex procedures of wrapping such a handle with covering material have usually been resorted to with such techniques, special skills, and in some instances special equipment frequently have had to be used to ensure appropriate tension, "lay", etc. of the handle covering material as it is finally positioned on the handle. In attempts to overcome the drawbacks of such techniques, there have been proposals for other solutions, but even these have not found widespread acceptance, perhaps because most have involved special application equipment and/or techniques requiring comparatively high skills levels in order to produce satisfactory results. In this connection reference is made to the following U.S. Pat. Nos: Hall 2,038,840; Hamel 1,669,053; and Armstrong 1,448,901.

Accordingly, it is an object of this invention to provide a means for covering the handle portion of hand-held implements.

Another object of this invention is to provide such a means which is easy to install.

Yet another object of this invention is to provide such a means which is comparatively inexpensive.

Still another object of this invention is to provide a method for producing means which will achieve the foregoing objectives.

Another object of this invention is to provide means for containing and dispensing such re-covering means which is inexpensive and easily utilized by the user.

Another object of this invention is to provide such means, and means for containing and dispensing same, which are susceptible and accurate use by persons utilizing same.

Still another object of this invention is to provide a means for preparing covering materials into a form suitable to attain the aforesaid objects.

Another object of this invention is to provide apparatus for preparing covering materials useful in carrying out the aforesaid objects.

SUMMARY OF THE INVENTION

Desired objectives may be achieved through practice of the present invention, in embodiments of which tubular sleeves of handle covering material are positioned on the cylindrical portion of a mandrel having an adjacent conical section of enlarging diameter, and are rolled up on themselves to form helically cross-sectioned grommets of expanded diameter which may be transferred to a packaging core, from which they may be rolled onto and along the surface of the handle to be covered and then unrolled back toward the handle and to effect covering of the handle.

DESCRIPTION OF DRAWINGS

This invention may be clearly understood from the descriptions of preferred embodiments which follow and from the drawings which form a part of this disclosure in which FIG. 1 is a perspective view of embodiments of this invention, FIG. 2 is a detail view of a portion of FIG. 1, FIG. 3 depicts another embodiment of this invention, FIG. 4 depicts embodiments of this invention as they are being utilized, FIG. 5 depicts another embodiment of this invention, FIG. 6 depicts yet another embodiment of this invention.

DESCRIPTION OF PREFERRED EMBODIMENTS

Figure 7:
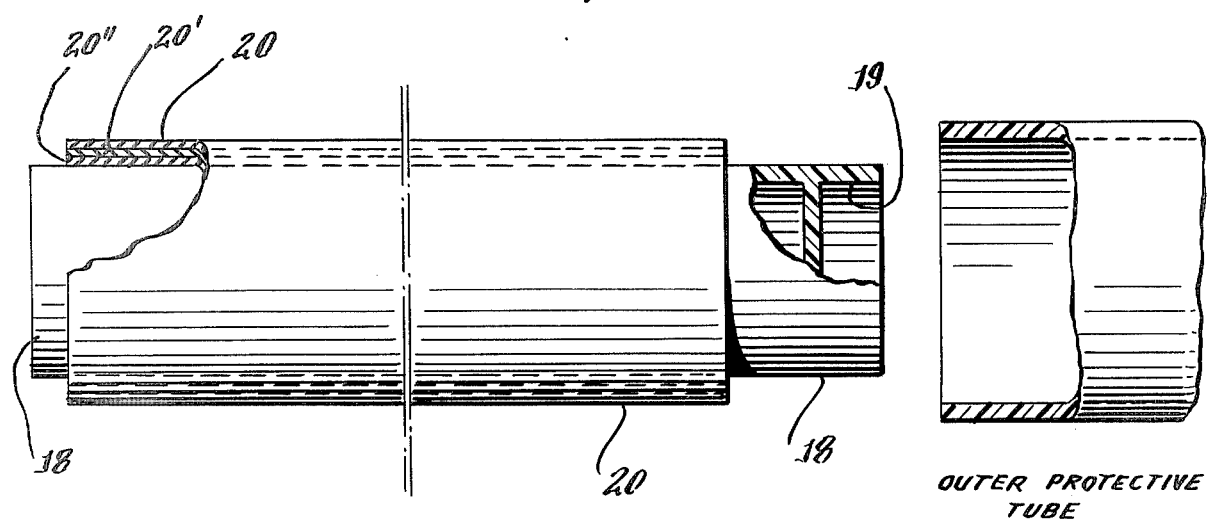
FIG. 7 depicts still another embodiment of this invention.

Referring first to FIG. 1, there is depicted a mandrel 9 having a shaft portion 10 which desirably may be substantially cylindrical, but optionally may be more or less conical, or even have substantially longitudinally oriented edges such that, in cross-section, it is polylateral with straight or curved sides, (e.g., square, polygonal, etc.), according to the general cross-sectional contour of the sleeve to be accomodated thereon and/or the handle surface to be covered, as hereinafter described. Advantageously, the mandrel 9 may have a substantially conical or otherwise flared-outward intermediate portion 11 adjacent the first or shaft portion 10, and an extreme end portion 14 adjacent the intermediate portion 11. The usefulness of these portions will be apparent from the description which follows.

It is advantageous for the shaft portion 10 to be of slightly larger outside "diameter" than the inside "diameter" of the sleeve(s) 12 to be manipulated thereon. By "diameter" in this context is meant the effective distances from the central axis of the mandrel or the sleeve (as the case may be) to the outside and inside respectively of the walls thereof at corresponding angular displacements through cross-sections of them respectively, whether either or both of them respectively are round, polygonal, or whatever. In other words, the use of the term "diameter" is not intended to infer any limitation to a circular cross-section. Optimally, the sleeve should be sufficiently tight on the mandrel when positioned thereon as to be manipulable as hereinafter described, but not so very tight as to make it inordinately difficult or impossible to position the sleeve thereon or to manipulate it after it is so positioned. As will be apparent from FIG. 1, a number of sleeves 12 may be processed on the mandrel 10, one after another. Each of them, after having been so positioned, may then be rolled up on itself to form a grommet-like roll, which may then be rolled along the surface of the mandrel, as is shown in greater detail in FIG. 2 over the conical intermediate section 11, whereby each roll is expanded to increase the inside diameter of the ring, and is then rolled onto the large diameter end section 14. Subsequently, one or more of the grommet-like rolls so formed may be transfered by rolling them along the surface 14 onto the outer surface of a packaging core 18, on which they may be further packaged for shipping, display, etc. In this form, they may be covered with an outer covering which is opaque or transparent, or desired degrees of rigidity, and imprinted as desired. The core 18 may be solid or hollow, made from paper, plastic, metal, or other suitable material, or any of a wide variety of cross-sectional shapes, but preferably cylindrical or having an outer surface comparable in shape and advantageously slightly larger in cross-sectional dimensions than the handle or other surface to which the rolled-up sleeve is to be applied. Such a core 18, with several rolled-up sleeves 20 positioned thereon, is depicted in FIG. 3.

FIG. 4 illustrates a manner in which embodiments of the present invention, such as those hereinbefore described, may be utilized. As illustrated, a core 18, on the outer surface of which are positioned one or more sleeve rings 20, has been aligned in generally abutting relationship to the butt end of the handle 31 of a tennis racquet 30. In order to facilitate application of a surfacing sleeve to such a handle, as hereinafter described, the end of the core selected for abutment to the handle end may be that toward which the sleeves were rolled when they were being installed on the core, so that as sleeve rings 20 are rolled onto the handle they will not yet become unrolled. To facilitate this, the core 18 may have a depressed receptacle 19 at one end into which the handle end may be inserted to ensure good transfer of the covering to the handle and also to ensure that the core is so oriented by the user when he desires to apply a covering to a handle. Of course, if the core is hollow, this feature may be accomodated by that means as well.

In this posture, the rolled-up sleeve 20 nearest to the end of the tennis racquet 30 may be rolled along the sleeve 18 without it unrolling until the outermost end of the rolled-up sleeve 20 is at a point along the handle at a distance from the end of the handle substantially equal to the length of the sleeve 20. The sleeve 20 may then be unrolled by pushing its grommet or still rolled-up portion back in the direction of the end of the handle. By exercising care in positioning the outside end of the rolled-up grommet, it is possible to have the end of the sleeve next adjacent the handle end positioned in the unrolled condition at the desired distance from the end of the handle, but of course minor positional adjustments may also be made, as by trimming off any excess by which the sleeve extends beyond the end of the handle. From the foregoing, it will be clear that by virtue of the rings 20 being oriented so that the exposed edge faces toward the end of the core 18 which is to be juxtaposed to the end of the handle on which the sleeve is to be applied, no collateral equipment, such as that utilized in the patents referred to above, is necessary to effect installation of a handle covering.

FIG. 5 depicts an embodiment of this invention in which the large diameter end section 14 is slightly smaller in diameter, preferably by about twice the wall thickness of the associated core 18, than the outside diameter of the shoulder 15 which forms the widest end of the conical surface 11. By this means, as illustrated, the core 18 may be slid over the end section 14 into abutment with the shoulder 15, so that rolled rings 20 may be rolled directly onto the core 18 after leaving the conical section 11. In FIG. 2, the extreme end 22 of the end section 14 has a reduced diameter cylindrical portion 24, preferably of diameter reduction about twice the thickness of the wall of the cores 18 to be associated therewith, in order to accomodate the end of a core to be positioned thereon to provide an outer surface of uniform diameter as between the end section and the core over which rolls 20 may be rolled. In FIG. 6, the embodiment depicted is adapted for one end of the core 18 to be merely abutted to the end of the end section 14 to receive rolled rings 20.

FIG. 7 depicts another embodiment of the present invention, in another form for packaging and transporting a multiplicity of sleeves of the type heretofore described. In this embodiment, rather than the sleeves 20 having been pre-rolled, for example into the grommet-like, spiral cross-section in the manner heretofore illustrated in the above-referenced figures, the sleeves 20', 20''. . . (20$^n$) are merely placed in the core 18 coaxially with respect to the core, as cylindrical tubes positioned one over another. Of course, such sleeves might also and/or otherwise be placed end to end on the core, and while this might not be as advantageous as being able to utilize a shorter core, in all of these instances the sleeves so positioned on the core are aptly described as being "coaxial with the core" within the meaning intended here. Such coaxial arrangements have been found to provide certain advantages that may be desired under some circumstances. For example, the material of each sleeve is under more nearly uniform stress throughout, than when in the grommet-like configuration previously discussed. As such, it may be rendered less prone to differing application characteristics when it comes time to be used, particularly where the material is made from certain material, such as rubbers and other elastomers, which may "age" with time and exposure to some ambient conditions such as heat. Installation in this form on associated tubes 18 may be done by a variety of known per se techniques, including pneumatic inflation, mechanical distending, etc.

So packaged, when use of the sleeves is desired, the outermost sleeve (e.g., 20 as shown in FIG. 7) may be rolled from the end farthest from the receptacle 19 into a grommet-like ring of the type heretofore described, and thereafter handled in the same manner as has been described. As in the case of the other embodiments of this invention, any excess of the sleeve 20 projecting beyond the handle end after installation, may be cut off so that finally the covering is of desired length with respect to the handle, and with covering material which is elastomeric, this may be facilitated by simply pulling the cover outward from the handle end to stretch it.

It will be apparent from the foregoing discussion that the handle coverings may be made from elastomers such as rubber, natural or synthetic, latex, or the like, plastic, or other suitable materials, preferably being tough, abrasion and tear resistant, strongly elastic and having a high coefficient of friction, in the interest of ensuring retention of the sleeve on the handle and retainability of the sleeved handle within the users hand, and to ensure endurability under the conditions of use which might be encountered. It will also be apparent that bonding means, such as adhesives, for example, might advantageously be applied to a handle surface before a sleeve is unrolled over it, thereby enhancing the tenacity with which the covering is retained in position on the handle. Further, even though this invention has been described in use on sporting equipment, it will be clear that it may be used advantageously in other applications as well, such as on the handles of hammers, screw drivers, other tools and the like. It should also be understood that embodiments of this invention may be made by merely rolling up the grommet-like rings of any of the types herein contemplated without the use of a mandrel or without the use of a core to position them on. In the latter instance, for example, a rolled ring may be so retained by taping around the ring portion or otherwise securing it against unrolling.

Thus, it will be apparent that the embodiments hereinbefore described and discussed are by way of illustration but not of limitation, and that other embodiments may be made by those skilled in the cognizant arts without departing from the spirit or scope of this invention.

I claim:
1. A method for applying elastomeric material in tubular form as a handle cover comprising the steps of
positioning one tube of rollable elastomeric material about a support core coaxially therewith and successively placing one or more additional tubes about each such tube last so positioned,
rolling one of said tubes into a grommet-like ring,
rolling said tube while rolled up into a grommet-like ring from said support core onto and along the outer surface of a handle to a desired position on said handle, and
unrolling said tube into position to serve as a cover for said handle.

* * * * *